US008745093B1

(12) United States Patent
Zhang et al.

(10) Patent No.: US 8,745,093 B1
(45) Date of Patent: Jun. 3, 2014

(54) METHOD AND APPARATUS FOR EXTRACTING ENTITY NAMES AND THEIR RELATIONS

(75) Inventors: Yimin Zhang, Beijing (CN); Joe F. Zhou, Beijing (CN)

(73) Assignee: Intel Corporation, Santa Clara, CA (US)

( * ) Notice: Subject to any disclaimer, the term of this patent is extended or adjusted under 35 U.S.C. 154(b) by 3148 days.

(21) Appl. No.: 10/019,879

(22) PCT Filed: Sep. 28, 2000 (Under 37 CFR 1.47)

(86) PCT No.: PCT/CN00/00293
§ 371 (c)(1),
(2), (4) Date: Oct. 18, 2003

(87) PCT Pub. No.: WO02/27542
PCT Pub. Date: Apr. 4, 2002

(51) Int. Cl.
*G06F 7/00* (2006.01)
*G06F 17/30* (2006.01)

(52) U.S. Cl.
USPC .................................. 707/797; 76/16; 76/26

(58) Field of Classification Search
USPC ............. 706/20, 25, 26, 16–18; 707/755, 797
See application file for complete search history.

(56) References Cited

U.S. PATENT DOCUMENTS

| 5,644,740 | A | * | 7/1997 | Kiuchi | 715/853 |
| 5,675,710 | A | * | 10/1997 | Lewis | 706/12 |
| 5,721,895 | A | * | 2/1998 | Velissaropoulos et al. | 707/797 |
| 5,796,296 | A | * | 8/1998 | Krzentz | 327/545 |
| 5,841,895 | A | * | 11/1998 | Huffman | 382/155 |
| 5,966,686 | A | * | 10/1999 | Heidorn et al. | 704/9 |
| 6,006,221 | A | * | 12/1999 | Liddy et al. | 1/1 |
| 6,076,088 | A | * | 6/2000 | Paik et al. | 1/1 |
| 6,182,028 | B1 | * | 1/2001 | Karaali et al. | 704/9 |
| 6,263,335 | B1 | * | 7/2001 | Paik et al. | 1/1 |
| 6,311,152 | B1 | * | 10/2001 | Bai et al. | 704/9 |
| 6,519,588 | B1 | * | 2/2003 | Leschner | 1/1 |
| 6,952,666 | B1 | * | 10/2005 | Weise | 704/9 |
| 7,376,635 | B1 | * | 5/2008 | Porcari et al. | 1/1 |
| 7,398,196 | B1 | * | 7/2008 | Liu et al. | 704/1 |

FOREIGN PATENT DOCUMENTS

EP 0679999 11/1995

OTHER PUBLICATIONS

Jorn Veenstra and Sabine Buchholz, Fast NP Chunking Using Memory-Based Learning Techniques, published Apr. 20, 1998, pp. 1-9.*
Walter Daelemans, Sabine Buchholz and Jorn Veenstra, Memory-Based Shallow Parsing, published Jun. 2, 1999, pp. 1-8.*
Walter Daelemans, TiMBL: Tilburg Memory Based Learner v. 2.0 Reference Guide, published Jan. 5, 1999, pp. 1-53.*

(Continued)

*Primary Examiner* — Jeffrey A Burke
(74) *Attorney, Agent, or Firm* — Blakely, Sokoloff, Taylor & Zafman LLP

(57) ABSTRACT

According to one embodiment of the invention, a method includes generating a person-name Information Gain (IG)-Tree and a relation IG-Tree from annotated data. The method also includes tagging and partial parsing of an input document. The names of the persons are extracted within the input document using the person-name IG-tree. Additionally, names of organizations are extracted within the input document. The method also includes extracting entity names that are not names of persons and organizations within the input document. Further, the relations between the identified entity names are extracted using the relation-IG-tree.

15 Claims, 3 Drawing Sheets

(56) References Cited

OTHER PUBLICATIONS

Jakub Zavrel and Walter Daelemans, Recent Advances in Memory-based Part-of-speech Tagging, VI Simposio Internacional de Comunicacion Social, Published 1999, pp. 590-597.*

Walter Daelemans, IGTree: Using Trees for Compression and Classification in Lazy Learning Algorithms, Artificial Intelligence Review 11, pp. 407-423, published 1997.*

Andrew Borthwick et al., Exploiting Knowledge Sources via Maximum Entropy in Named Entity Recognition, published 1998.*

Hsin-Hsi Chen et al., Named Entity Extraction for Information Retrieval, Computer Processing of Oriental Languages, vol. 11, No. 4, published 1998.*

Sekine, Satoshi, Ralph Grishman, and Hiroyuki Shinnou. "A decision tree method for finding and classifying names in Japanese texts." Proceedings of the Sixth Workshop on Very Large Corpora. 1998.*

International Search Report for International Application No. PCT/CN/00/00293. Mailing date Dec. 28, 2000. 3 pages.

* cited by examiner

METHOD AND APPARATUS FOR EXTRACTING ENTITY NAMES AND THEIR RELATIONS

FIELD

The invention relates to the field of information extraction. More specifically, the invention related to a method and apparatus for extracting entity names and their relations.

BACKGROUND

Due to an increased knowledge base, the number of documents across different subject matter areas continues to grow. For example, with the advent of the Internet and the World Wide Web (WWW), the documents on the different web sites on the Internet continues to grow as the number of networks and servers connected thereto continue to increase on a global scale. Accordingly, the fields of information retrieval, document summarization, information filtering and/or routing as well as topic tracking and/or detection systems continue to grow in order to track and service the vast amount of information.

In the field of information extraction, work has been done to automatically learn patterns from a training corpus in order to extract entity names and their relations from a given document. A training corpus is defined to include writings, documents, or works for a given subject matter. Moreover, an entity name is defined to include, but is not limited to, proper names. Examples of entity names include a person's name, a organization's name and a product's name. Currently, tools for the extraction of entity names include man-made rules and keyword sets to identify entity names. Disadvantageously, building rules is often complex, error-prone and time-consuming and usually requires a through understanding and detailed knowledge of the system internals of a given language.

Another technique currently employed in the extraction of entity names includes a statistical method. However, the training of such a system requires vast amounts of human annotated data in order to provide an accurate statistical analysis. Moreover, this statistical method for the extraction of entity names is limited in that only local context information can be employed during the training of this method.

BRIEF DESCRIPTION OF THE DRAWINGS

Embodiments of the invention may be best understood by referring to the following description and accompanying drawings which illustrate such embodiments. In the drawings.

DETAILED DESCRIPTION

In the following description, numerous specific details are set forth to provide a thorough understanding of the invention. However, it is understood that the invention may be practiced without these specific details. In other instances, well-known structures and techniques have not been shown in detail in order not to obscure embodiments of the present invention.

Figure 1:
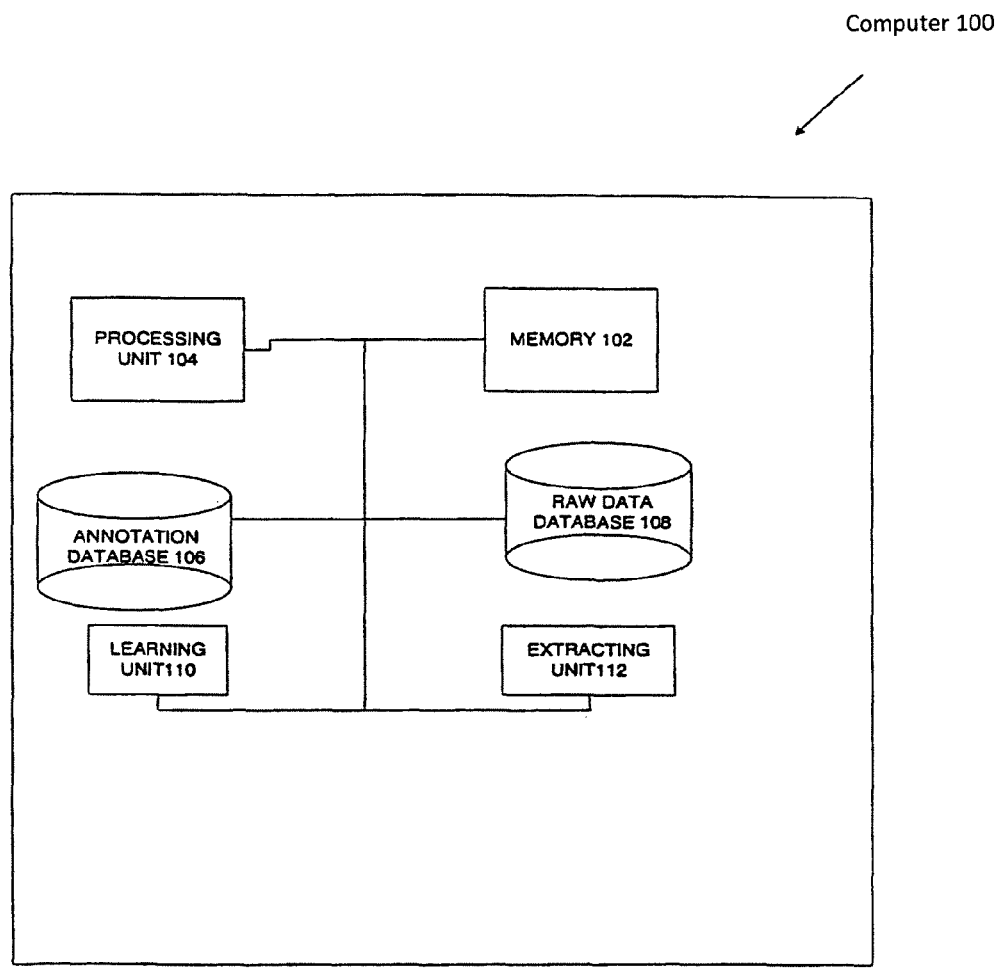
FIG. 1 illustrates a computer that provides for entity name extractions and relations, according to embodiments of the present invention.

FIG. 1 illustrates a computer that provides for entity name extractions and relations, according to embodiments of the present invention. As shown, computer 100 includes processing unit 104, memory 102, annotation database 106, raw data database 108, learning unit 110 and extracting unit 112, which are coupled together. In one embodiment, learning unit 110 and extracting unit 112 are software programs that can reside in memory 102 and processing unit 104 during their executing on processing unit 104.

In particular, memory 102 includes a machine-readable medium on which is stored a set of instructions (i.e., software) embodying any one, or all, of the methodologies described herein. Software can reside, completely or at least partially, within memory 102 and/or within processing unit 104. For the purposes of this specification, the term "machine-readable medium" shall be taken to include any mechanism that provides (i.e., stores and/or transmits) information in a form readable by a machine (e.g., a computer). For example, a machine-readable medium includes read only memory (ROM); random access memory (RAM); magnetic disk storage media; optical storage media; flash memory devices; electrical, optical, acoustical or other form of propagated signals (e.g., carrier waves, infrared signals, digital signals, etc.); etc.

Figure 2:
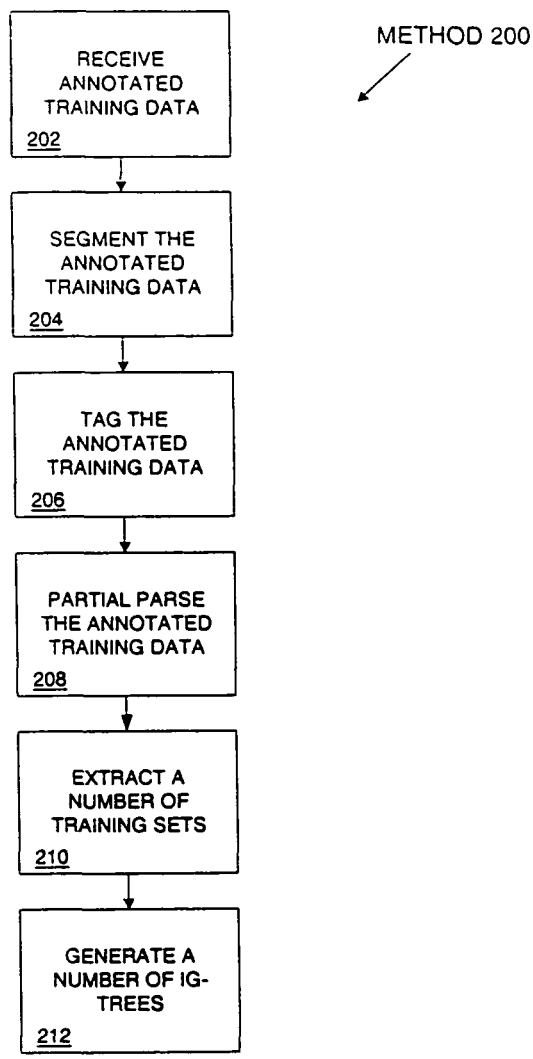
FIG. 2 is a flowchart illustrating a method of training for subsequent extraction of entity names and determination of relations of such entity names, according to embodiments of the present invention.

In conjunction with computer 100 of FIG. 1, a method of operation of computer 100 in accordance with embodiments of the present invention will now be described with the reference to the flow chart shown in FIG. 2. In particular, FIG. 2 is a flowchart illustrating a method for the generation of training data employed for subsequent extraction of entity names and determination of relations of such entity names, according to embodiments of the present invention. Learning unit 110 generates method 200 of FIG. 2. Moreover, as will be described below, method 200 employs a memory-based learning technique in the generation of the Information Gain (IG)-Trees, which are subsequently employed in the extraction of entity names and relations there between for a given document or set of documents.

FIG. 2 illustrates method 200 that commences with the receipt of annotated training data by learning process, at process block 202. In an embodiment, such annotated training data is generated by a data analyst or an expert in a given subject matter domain to which the annotated training data relates. In one such embodiment, this person is presented with raw data that includes different entity names and annotates such entity names as well as the relations between such entity names. In one embodiment, an entity names is defined to include proper names for persons, locations, product and organizations. For example, an organization entity name is INTEL®. However, embodiments of the present invention are not so limited, as any other type of entity having a proper name can be defined to have entity name. For example, the names of a pet could also be considered an entity name.

Accordingly, a data analyst or domain expert receives and defines annotations for these entity names. For example, a given sentence in the raw data for the organization entity name of INTEL® could be annotated: "INTEL® is a leading designer and manufacturer of computer processors." In an embodiment, Extensible Markup Language (XML) tags are employed for the insertion of the annotations into the raw data. These annotations allow for the tracking of the different classes of entities as well as assignments of unique identifications for the different entity names within the raw data.

Returning to the INTEL® example described above, the following XML tag can be inserted into the raw data:

(1) "<ENT ID=1 Class=ORGANIZATION> INTEL®</ENT> is a leading designer and manufacturer of computer processors."

As shown, the "<ENT" and "</ENT>" denote the XML tag, which includes a class category assignment and an identification (ID) assignment. In particular, the class category assignment and the ID assignment for INTEL® are organization and one, respectively. Accordingly, subsequent processing by learning unit 110 can incorporate or ignore the XML annotation tags by using masking techniques to recognize or not recognize such tags, as is known in the art. The above-described annotation technique is by way of example and not by way of limitation, as other techniques can be employed in the annotation of the data.

Additionally, a data analyst or domain expert also annotates the relationship among and between the different entity names. For example, for the entity names of John Smith and INTEL®, the relationship could be: "John Smith is a senior vice president of INTEL®." Accordingly, the relationship between the person entity name of "John Smith" and the organization entity name of INTEL® could be employee/employer relationship.

In an embodiment, Extensible Markup Language (XML) tags are employed for the insertion of the annotations regarding the relationship among the entity names, which were provided by the data analyst or domain expert. These annotations allow for the tracking of the relationships among the different classes of entities. Returning to the John Smith/INTEL® example described above, the following XML tag can be inserted into the raw data:

(2) "John Smith is a senior vice president of INTEL®<REL TYPE=Employee-OF ID=1 ID=2>."

As shown, the "<" and ">" denote the XML tag, which includes the ID numbers for the entity names as well as the relationship there between. In particular, the ID numbers for INTEL® and John Smith are one and two respectively. Additionally, the relationship type between the two entity names is "Employee-OF." Similar to the annotations for the entity names, subsequent processing by learning unit 110 can incorporate or ignore the XML annotation tags for the relationships between the entity names by using masking techniques to recognize or not recognize such tags, as is known in the art. The above-described annotation technique is by way of example and not by way of limitation, as other techniques can be employed in the annotation of the data. In an embodiment, this raw data that has been annotated regarding the entity names and their relations is stored in annotation database 106.

The above-described annotated data was described in terms of a manual entry of the annotations and relations among the entity names by a data analyst or a domain expert. However, embodiments of the present invention are not so limited, as other sources can be employed in generating of the annotated data. For example, such data can be obtained via a database and/or automated computer applications.

Returning to FIG. 2, in one embodiment, this annotated data outputted from process block 202 is segmented, at process block 204. In particular, in certain languages, such as Chinese, there is no space between words. Therefore, in such embodiments, the word boundaries are defined, thereby allowing the words within the annotated data to be identified and segmented (i.e., separated). Accordingly, this segmentation provides a space between each of the words in the annotated data. In an embodiment, a software application can receive the annotated data and can automatically output segmented annotated data, as there are different software applications available to provide this functionality for different languages. However, embodiments of the present invention are not so limited, as other processes can be employed for the segmentation of the annotated data. For example, in an embodiment, a data analyst or a domain expert can analyze and segment the words within the annotated data.

In an embodiment, learning unit 110 also tags this annotated data, at process block 206. In particular, tagging is defined to include the marking of the words in the annotated data as their given type. For example, the words in the annotated data can be tagged as verbs, nouns, proper nouns, pronouns, adverbs, adjective, etc. In an embodiment, software applications, as are known in the art, are employed in the tagging of this data.

Moreover, learning unit 110 partially parses this annotated data, at process block 208. In particular, partial parsing identifies the syntactic structure of the sentences within the annotated data. For example, learning unit 110 identifies subjects, main verbs and objects of the sentences. However, embodiments of the present invention are not so limited, as other syntactic structures of a sentence can also be identified during this partial parsing process. For example, the prepositional phrases, subordinate clauses or other structures can be identified in the partial parsing process.

Learning unit 110 then generates a number of training sets from the parsed annotated data, at process block 210. In one such embodiment, four training sets are extracted from the parsed annotated data. A first training set includes the features of the first and last word in a person's name in the training data. Learning unit 110 also generates a second training set, which includes the features for the entity names in the training data. Moreover, learning unit 110 generates a third training set, which includes the features for the noun phrases in the training data. Noun phrases are defined to include those phrases in the sentences that include one to a number of noun phrases therein. Learning unit 110 also generates a fourth training set, which includes the features of the relations between entity names in the training data. The above-described training sets are by way of example and not by way of limitation, as other types of training sets can be incorporated into embodiments of the present invention.

In one embodiment, a feature of a given word or set of words is defined to include (1) local context features, (2) global context features, (3) surface linguistic features and (4) deep linguistic features, as are known in the art. For example, local context features of a word or set of words include the features extracted from the local context of the word or set of words. An example of a local context feature could include the n-th word before and/or after the word or word sequence. Another example of a local context feature could include the nearest verb before and/or after the word or word sequence. Such features are described in more detail below in conjunction with the Information Gain (IG)-Trees, which are generated from these training sets.

At process block 212, learning unit 110 generates one to a number of Information Gain (IG)-Trees employing a memory-based learning technique, as is known in the art. In particular, memory-based learning is a type of learning that is supervised and inductive and is based on examples. Memory-based learning entails a classification based supervised learning approach. Embodiments of memory-based learning include similarity-based, example-based, analogical, case-based, instance-based and lazy learning depending on the context. In one embodiment, learning unit 110 generates (1) a person name IG-Tree, (2) a entity name IG-Tree, (3) a noun phrase IG-Tree and (4) a relation-IG-Tree based on the person name training set, the entity name training set, the noun phrase training set and the relation training set, respectively. The above-described IG-Trees are by way of example and not by way of limitation, as other types of IG-Trees can be incorporated into embodiments of the present invention.

With regard to the person-name IG-Tree and the noun-phrase IG-Tree, examples of features included therein will now be described. In an embodiment, context features are defined in terms of the character types of words in proximity to the word or word sequence. Examples of a character type for a word includes, but is not limited to, a surname, a number, types of ASCII characters and normal words. A context feature for a given word could, therefore, include the character type of the n-th previous word or the character type of the n-th word subsequent to the word or word sequence. Further examples of context features for a given word or word sequence could include the number of characters in the n-th previous and/or next word. Moreover, the context features could include the actual n-th previous or next word in relationship to the given word or word sequence. In an embodiment, another set of relevant context features includes the tags for the previous and/or next n-th word.

In one embodiment, an additional context feature is the dependency relation for the context words. Examples of such dependency relations includes, but are not limited to, an adjective/noun relation wherein the adjective is modifying the noun, (2) verb/noun wherein the verb is the predicate for a noun acting as an object, (3) noun/verb wherein the noun is the subject and the verb is the predicate, (4) preposition/object, (5) adverb/head wherein the head can be a verb or adjective, (6) noun/noun, wherein a noun is modifying a noun and (7) verb/verb, wherein the second verb is the object of the first verb.

In one embodiment, a dependency relation includes the first verb appearing before and/or after the given word or word sequence in the same sentence. In an embodiment, a dependency relation includes the syntactical relationship between a verb and the given word or word sequence. For example, for a given sentence, there could be an object/verb relationship or a subject/verb relationship. Moreover, in one embodiment, another dependency relations are the semantic features for a given syntactical relationship between a verb and the word or word sequence. In an embodiment, another context feature for a given word or word sequence includes bigram and mutual information features, as are known in the art.

The class labels associated with each word for a person-name IG-Tree include (1) the left boundary of a person name, (2) the right boundary of a person name and (3) whether or not the word is in a person name. The class labels associated with each word for a noun-phrase IG-Tree include (1) the left boundary of the noun phrase, (2) the right boundary of the noun phrase and (3) whether or not the word is in a noun phrase. Accordingly, in the extracting process that is described below, these features help in determining a word's or word sequence's class, thereby allowing the extracting process to determine the boundary of a noun phrase/person name in a given document or set of documents.

With regard to the entity-name IG-Tree, examples of features included therein will now be described. In an embodiment, a local context feature included in the entity-name IG-Tree could be the relationship of the word or word sequence with a verb in the same sentence. For example, one such feature could be the first verb appearing after the entity name in the same sentence. Another example could be the first verb appearing before the entity name in the same sentence.

In one embodiment, another local context feature included in the entity-name IG-Tree could be the syntactical relationship of the word or word sequence with a given verb. Such syntactical relationships could be object/verb or a subject/verb. For example, if a given sentence is "I eat rice" and the current word is "rice", the object/verb of such a word would be "eat" while the subject/verb would be "I." Another example of a syntactical relationship could be the preposition word before this given entity name. Moreover, another local context feature could include the semantic features. An example of a semantic feature could be the semantic category of the headword of a given entity name. Another example of a semantic feature could be the semantic category of the verb for a given object/verb or subject/verb syntactical relationship.

Global context features provide a broader view of a word or word sequence with regard to the entire document. For example, a global context feature included in the entity-name IG-Tree could be a set of first verbs in a same sentence that appear after a word or word sequence for the entire document or corpus. In a similar example, another global context feature included in the entity-name IG-Tree could be a set of first verbs in a same sentence that appear before a word or word sequence for the entire document or corpus.

The class labels associated with each entity name for an entity-name IG-Tree include their types. Examples of an entity name type include, but are not limited to person, organization and product. Accordingly, in the extracting process that is described below, these features help in determining an entity name's class label, thereby allowing the extracting process to determine the boundary of a entity name in a given document or set of documents.

With regard to the relation IG-Tree, examples of features included therein will now be described. In an embodiment, one feature includes the syntactic position for this entity name. For example, a syntactic position could be the head of the subject or the modifier of the subject for a given sentence. Another feature that can be included is a set of words or entity names in the subject, the modifier of the subject or the head of the subject. Moreover, another feature could be the semantic category of the head of the subject or the set of semantic categories of terms in the modifier of the subject.

In one embodiment, features that can be included in the relation IG-Tree can include a set of words or entity names in the object, in the modifier of the object or in the head of the object. Other features that can be included are the semantic categories of the head of the object as well as the set of semantic categories of terms in the modifier of the object. Additional features can include the main verb of the sentence and the semantic category of this verb.

Another set of features to be included in the relation IG-Tree relates to the prepositions in the different sentences. For example, one set of such features could be the first preposition in a given sentence as well as a set of the words or entity names in the object of the first preposition in this sentence. This example is applicable for any preposition phrase within a sentence. For example, another set of features could be the second preposition in a given sentence as well as a set of the words or entity names in the object of the second preposition phrase in this sentence.

The class labels for the relation IG-Tree include the relationship name as well as the entity names that define the relationship. For example, for an employee/company relationship, the relationship could be "employee of" while the entity names could include the employee and the organization. Accordingly, in the extracting process that is described below, these features help in determining a class label for a given relationship between two entity names.

The above-described features included in the different IG-Trees are by way of example and not by way of limitation. For example, embodiments of the present invention can incorporate other types of features into the different IG-Trees. Moreover, embodiments of the present invention can incorporate the features described for a given IG-Tree into other IG-Trees.

Figure 3:
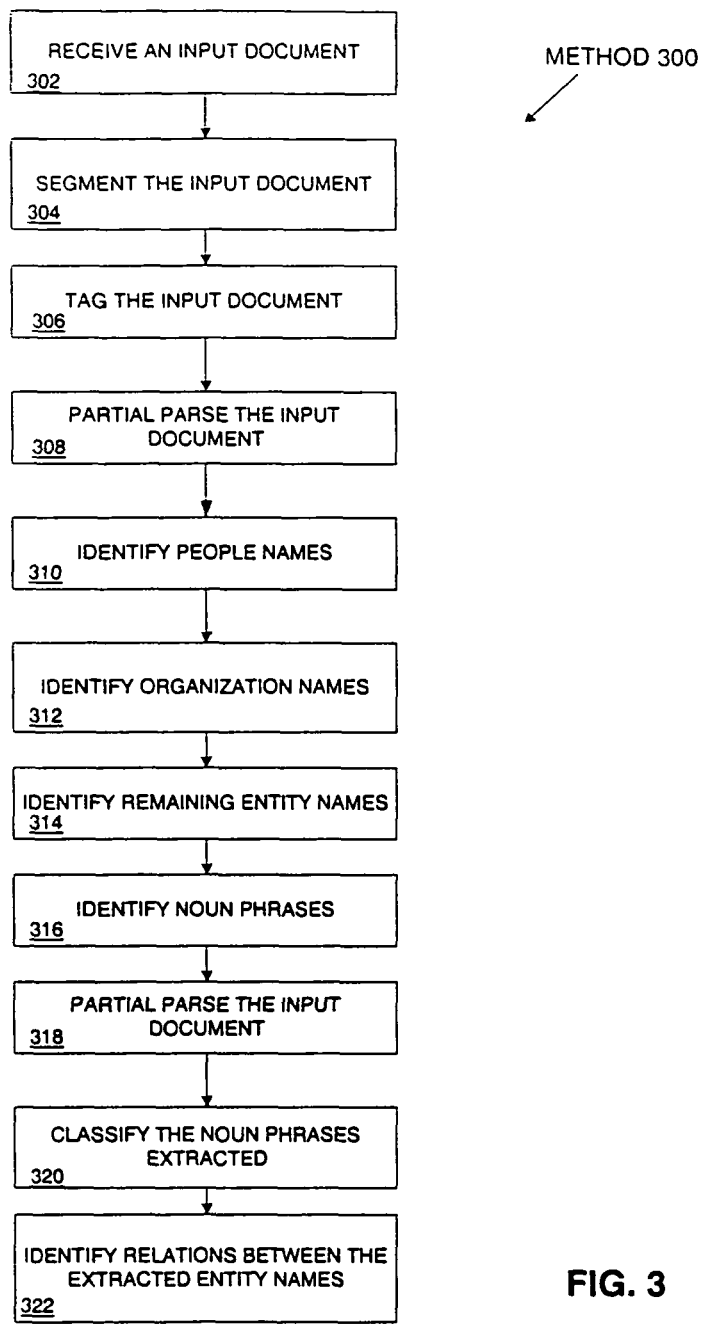
FIG. 3 is a flowchart illustrating a method for the extraction of entity names and relations there between based on the training data generated by learning unit 110, according to embodiments of the present invention.

Accordingly, learning unit 110 illustrated in FIG. 2 generates a number of IG-Trees based on the annotated data received. In conjunction with computer 102 of FIG. 1, a method of operation of computer 102 in accordance with embodiments of the present invention will now be described with reference to the flow chart shown in FIG. 3. In particular, FIG. 3 is a flowchart illustrating a method for the extraction of entity names and relations there between based on the IG-Trees generated by learning unit 110, according to embodiments of the present invention. Extracting unit 112 generates method 300 of FIG. 3.

Method 300 commences with the receipt of an input document by extracting unit 112, at process block 302. In an embodiment, extracting unit 112 segments the input document, at process block 304. As described above in conjunction with the segmenting of the annotated data, in certain languages, such as Chinese, there is no space between words. Therefore, in such embodiments, the word boundaries are defined, thereby allowing the words within the input document to be identified and segmented (i.e., separated). Accordingly, this segmentation provides a space between each of the words in the input document. In an embodiment, a software application can receive the input document and can automatically output a document that has been segmented, as there are different software applications available to provide this functionality for different languages. However, embodiments of the present invention are not so limited, as other processes can be employed for the segmentation of the input document. For example, in an embodiment, a data analyst or a domain expert can analyze and segment the words within the input document.

In one embodiment, extracting unit 112 tags the input document, at process block 306. In particular, tagging is defined to include the marking of the words in the input document as their given type. For example, the words in the input document can be tagged as verbs, nouns, proper nouns, pronouns, adverbs, adjective, etc. In an embodiment, software applications, as are known in the art, are employed in the tagging of this data.

Additionally, in an embodiment, extracting unit 112 partially parses the input document. Partial parsing, at clock 308, identifies the syntactic structure of the sentences within the input document. For example, extracting unit 112 identifies subjects, main verbs and objects of the sentences. However, embodiments of the present invention are not so limited, as other syntactic structures of a sentence can also be identified during this partial parsing process. For example, the prepositional phrases, subordinate clauses or other structures can be identified in the partial parsing process.

Extracting unit 112 also identifies the people names within the input document using the person-name IG-Tree generated by learning unit 110, at process block 310. Such technique of extracting or identifying given words from a document using IG-Trees is known in the art. In one such embodiment, the input document has been segmented, tagged and/or partially parsed prior to the identification of the people names.

Moreover, extracting unit 112, at block 312, identifies the organizational names within the input document using simple pattern matching rules, as are known in the art. For example, if given noun phrase includes the terms "corp." or "ltd.", such pattern matching rules assume that this noun phrase is an organization names. In one such embodiment, the input document has been segmented, tagged and/or partially parsed prior to the identification of the people names.

Additionally extracting unit 112 identifies the remaining entity names, such as product names, that have not already been identified using simple pattern matching rules, as are known in the art, at process block 314. In one such embodiment, the input document has been segmented, tagged and/or partially parsed prior to the identification of the people names. Moreover, extracting unit 112 also identifies the noun phrases in the input document using the noun-phrase IG-Tree that was generated by learning unit 110, at process block 316.

Further, in an embodiment, extracting unit 112 performs an additional partial parsing procedure using the entity names and noun phrases that were previously extracted, at process block 318. In one embodiment, extracting unit 112 classifies the noun phrases that were extracted into different categories, at process block 320. Examples of the different categories include person, location, organization, etc. Accordingly, this classification of noun phrases can be compared to the previously identified entity names to allow for the identification of those entity names that might be missed in prior identifications at block 322.

Additionally, extracting unit 112 identifies relations between and among the identified (extracted) entity names using the relation IG-tree generated by learning unit 110. Accordingly, extracting unit 112 can extract the entity names and the relations there between using IG-Trees employing on a memory-based learning technique.

Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method comprising:
   receiving annotated data;
   parsing, at least partially, the annotated data, wherein parsing includes identifying syntactic structure of sentences within the annotated data; and
   extracting training sets from the parsed annotated data, wherein the training sets are based on a plurality of features, wherein extracting comprises at least one of tagging the annotated data for marking words, and defining and segmenting words based on languages, wherein extracting further comprises extracting entity names and relations between entity names based on the information sets, and wherein extracting further comprises identifying information sets using memory-based Information Gain (IG)-Trees, wherein the IG-Trees are generated based on the plurality of features, wherein the plurality of features comprise one or more of words, phrases, sentences, and objects, and wherein each information set is identified based on a corresponding memory-based IG-Tree including one or more of a person-name IG-Tree, an entity-name IG-Tree, a noun phrase IG-Tree, and a relation IG-Tree.

2. The method of claim 1, wherein the plurality of features comprise local context features that are extracted from syntactical relationship between two or more words of a set of words, and wherein the local context features are further extracted from a semantic feature relating to a semantic category of one or more headwords of the set of words, wherein the plurality of features further comprise one or more of global context features, surface linguistic features, and deep linguistic features, wherein the global context features comprise a broader view of each of the set of words in relation with content of an entire document that contains the set of words.

3. The method of claim 1, wherein memory-based IG-Trees are based on memory-based learning including classification-based supervised learning, wherein the memory-based learning includes one or more of similarity-based learning, example-based learning, analogy-based learning, case-based learning, instance-based learning, and lazy learning.

4. The method of claim 1, wherein the training sets comprise one or more a first training set including words in names, a second training set including entity names, a third training set including phrases, and a fourth training set including relationships amongst the entities.

5. The method of claim 1, wherein the marked words comprise one or more of nouns, verbs, proper nouns, pronouns, adverbs, and adjectives, wherein the marked words are compared with previously-identified marked words to identify missing marked words.

6. A system having a storage device to store instructions, and a processing device to execute the instructions, wherein the execution of the instructions cause the processing device to perform one or more operations comprising:
receiving annotated data;
parsing, at least partially, the annotated data, wherein parsing includes identifying syntactic structure of sentences within the annotated data; and
extracting training sets from the parsed annotated data, wherein the training sets are based on a plurality of features, wherein extracting comprises at least one of tagging the annotated data for marking words, and defining and segmenting words based on languages, wherein extracting further comprises extracting entity names and relations between entity names based on the information sets, and wherein extracting further comprises identifying information sets using memory-based Information Gain (IG)-Trees, wherein the IG-Trees are generated based on the plurality of features, wherein the plurality of features comprise one or more of words, phrases, sentences, and objects, and wherein each information set is identified based on a corresponding memory-based IG-Tree including one or more of a person-name IG-Tree, an entity-name IG-Tree, a noun phrase IG-Tree, and a relation IG-Tree.

7. The system of claim 6, wherein the plurality of features comprise local context features that are extracted from syntactical relationship between two or more words of a set of words, and wherein the local context features are further extracted from a semantic feature relating to a semantic category of one or more headwords of the set of words, wherein the plurality of features further comprise one or more of global context features, surface linguistic features, and deep linguistic features, wherein the global context features comprise a broader view of each of the set of words in relation with content of an entire document that contains the set of words.

8. The system of claim 6, wherein memory-based IG-Trees are based on memory-based learning including classification-based supervised learning, wherein the memory-based learning includes one or more of similarity-based learning, example-based learning, analogy-based learning, case-based learning, instance-based learning, and lazy learning.

9. The system of claim 6, wherein the training sets comprise one or more a first training set including words in names, a second training set including entity names, a third training set including phrases, and a fourth training set including relationships amongst the entities.

10. The system of claim 6, wherein the marked words comprise one or more of nouns, verbs, proper nouns, pronouns, adverbs, and adjectives, wherein the marked words are compared with previously-identified marked words to identify missing marked words.

11. A machine-readable medium having stored thereon instructions which when executed by a processing device, cause the computing device to perform one or more operations comprising:
receiving annotated data;
parsing, at least partially, the annotated data, wherein parsing includes identifying syntactic structure of sentences within the annotated data;
extracting training sets from the parsed annotated data, wherein the training sets are based on a plurality of features, wherein extracting comprises at least one of tagging the annotated data for marking words, and defining and segmenting words based on languages, wherein extracting further comprises extracting entity names and relations between entity names based on the information sets, and wherein extracting further comprises identifying information sets using memory-based Information Gain (IG)-Trees, wherein the IG-Trees are generated based on the plurality of features, wherein the plurality of features comprise one or more of words, phrases, sentences, and objects, and wherein each information set is identified based on a corresponding memory-based IG-Tree including one or more of a person-name IG-Tree, an entity-name IG-Tree, a noun phrase IG-Tree, and a relation IG-Tree.

12. The machine-readable medium of claim 11, wherein the plurality of features comprise local context features that are extracted from syntactical relationship between two or more words of a set of words, and wherein the local context features are further extracted from a semantic feature relating to a semantic category of one or more headwords of the set of words, wherein the plurality of features further comprise one or more of global context features, surface linguistic features, and deep linguistic features, wherein the global context features comprise a broader view of each of the set of words in relation with content of an entire document that contains the set of words.

13. The machine-readable medium of claim 11, wherein memory-based IG-Trees are based on memory-based learning including classification-based supervised learning, wherein the memory-based learning includes one or more of similarity-based learning, example-based learning, analogy-based learning, case-based learning, instance-based learning, and lazy learning.

14. The machine-readable medium of claim 11, wherein the training sets comprise one or more a first training set including words in names, a second training set including entity names, a third training set including phrases, and a fourth training set including relationships amongst the entities.

15. The machine-readable medium of claim 11, wherein the marked words comprise one or more of nouns, verbs, proper nouns, pronouns, adverbs, and adjectives, wherein the marked words are compared with previously-identified marked words to identify missing marked words.

* * * * *